US007216164B1

(12) United States Patent
Whitmore et al.

(10) Patent No.: US 7,216,164 B1
(45) Date of Patent: May 8, 2007

(54) METHODS AND APPARATUS FOR DETERMINING THE PERFORMANCE OF A SERVER

(75) Inventors: Bryan Whitmore, Fitchburg, MA (US); James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 832 days.

(21) Appl. No.: 10/267,936

(22) Filed: Oct. 9, 2002

(51) Int. Cl.
*G06F 15/173* (2006.01)

(52) U.S. Cl. .................... 709/224; 709/223
(58) Field of Classification Search ............... 709/223, 709/224
See application file for complete search history.

(56) References Cited

U.S. PATENT DOCUMENTS

| | | | | |
|---|---|---|---|---|
| 4,200,771 A | * | 4/1980 | Kraushaar et al. ........... 379/138 |
| 5,819,033 A | * | 10/1998 | Caccavale ................... 709/224 |
| 6,185,601 B1 | | 2/2001 | Wolff ........................ 709/203 |
| 6,192,411 B1 | * | 2/2001 | Chan et al. .................. 709/232 |
| 6,243,761 B1 | * | 6/2001 | Mogul et al. ............... 709/246 |
| 6,351,775 B1 | | 2/2002 | Yu ............................ 709/238 |
| 6,374,297 B1 | | 4/2002 | Wolf et al. ................. 709/226 |
| 6,442,165 B1 | | 8/2002 | Sitaraman et al. ......... 370/395.4 |
| 6,510,463 B1 | * | 1/2003 | Farhat et al. ............... 709/224 |
| 6,564,342 B2 | * | 5/2003 | Landan ........................ 714/48 |
| 6,651,099 B1 | * | 11/2003 | Dietz et al. ................. 709/224 |
| 6,724,727 B2 | * | 4/2004 | Counterman ............... 370/235 |
| 6,738,813 B1 | * | 5/2004 | Reichman .................. 709/224 |
| 6,757,255 B1 | * | 6/2004 | Aoki et al. .................. 370/252 |
| 6,785,237 B1 | * | 8/2004 | Sufleta ...................... 370/236 |
| 2001/0029545 A1 | * | 10/2001 | Takahashi et al. .......... 709/234 |
| 2001/0047409 A1 | * | 11/2001 | Datta et al. ................. 709/224 |
| 2002/0152301 A1 | * | 10/2002 | Garrett et al. .............. 709/224 |
| 2002/0184363 A1 | * | 12/2002 | Viavant et al. ............. 709/224 |
| 2003/0086422 A1 | * | 5/2003 | Klinker et al. ............. 370/389 |
| 2003/0103465 A1 | * | 6/2003 | Counterman ............... 370/252 |
| 2003/0204586 A1 | * | 10/2003 | Schnetzler ................. 709/224 |
| 2003/0221000 A1 | * | 11/2003 | Cherkasova et al. ....... 709/224 |
| 2004/0001476 A1 | * | 1/2004 | Islam et al. ................. 370/352 |
| 2004/0003029 A1 | * | 1/2004 | Islam et al. ................. 709/203 |
| 2004/0073640 A1 | * | 4/2004 | Martin et al. .............. 709/223 |

OTHER PUBLICATIONS

K Poduri & K. Nichols; "Stimulation Studies of Increased Initial TCP Window Size", (Internal Draft) Internet Engineering Task Force, Cisco Technology, Inc. San Jose, California; Feb. 1998.

* cited by examiner

*Primary Examiner*—William Vaughn
*Assistant Examiner*—Joseph Maniwang
(74) *Attorney, Agent, or Firm*—Chapin IP Law, LLC; Barry W. Chapin, Esq.

(57) ABSTRACT

Mechanisms and techniques provide a method for determining the performance of a server, based upon a connection characteristic of a connection between the server and a client. The connection characteristic, such as the window size of the server, provides information regarding the performance or capacity of the server. Variation between the connection characteristic and a preferred connection characteristic is used by a data communications device, for example, to determine the performance of the server. Based upon the variation in the connection characteristic, the data communications device is then able to direct incoming content requests to other servers in communication with a network, as required.

27 Claims, 6 Drawing Sheets

METHODS AND APPARATUS FOR DETERMINING THE PERFORMANCE OF A SERVER

BACKGROUND OF THE INVENTION

Computer networks are used to facilitate the exchange of information among computers in communication within the network. Such computer networks include computer systems, or clients, that request information from a source and computer systems, or servers, that transmit information to a recipient. Data communications devices are located between the clients and servers to transmit packets of data across the network.

A group of servers can be coupled to the network via a data communications device such as a router or switch. This device operates to distribute incoming client requests for data to one server within the group of servers. The data communications device also prevents a single server from becoming overloaded with requests for content by multiple clients in a process known as load balancing.

Figure 1:
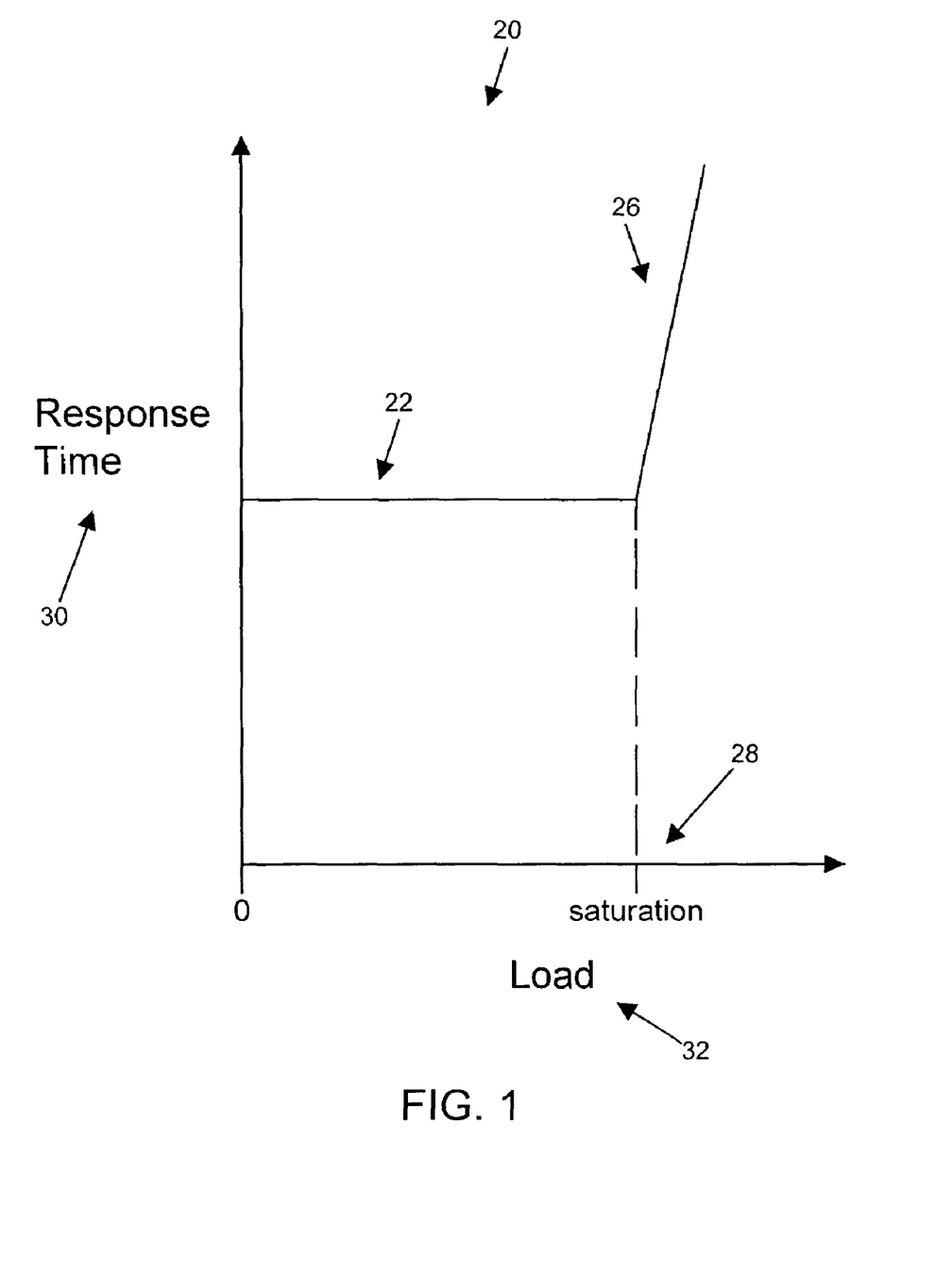
FIG. 1 illustrates a graph showing the relationship between response time and load for a server.

The number of requests that a server receives (i.e., the load on the server) affects the amount of time required by the server to respond to the content request. FIG. 1 shows a graph 20 of an example relationship between server response time 30 and server load 32. For a server load between zero and a saturation point 28, the time for response to content requests is approximately constant 22. For example, if the server load saturation point is eight content requests received in a given amount of time, the response time of the server remains approximately unchanged after receiving up to eight content requests. When the server reaches a load saturation point 28 for incoming requests, for example, greater than eight content requests received in a given amount of time, the response time of the server increases with an approximately vertical slope 26. Therefore, once the number of requests for information increases above a server's saturation point for a given period of time, the time for server response to each request increases.

To prevent a single server in a network from becoming saturated (i.e., unable to effectively respond to requests), conventional data communications devices determine the load or performance of each server in a network and direct content requests to the servers in the network based on the performance information. Typically, a conventional data communications device determines server performance using out-of-band and in-band performance checks.

In one type of conventional out-of-band performance check, or health check, the data communications device functions as if it were a client computer and forwards a connection establishment request to a server. If the server is able to respond to the request, the server acknowledges receipt of the connection establishment request from the data communications device, thereby indicating adequate performance of the server (i.e., confirming the server's ability to accept connections). If the server is unable to respond to the connection establishment request because, for example, the queue of the server contains a number of requests, the server rejects the connection, thereby indicating inadequate performance of the server. This type of out-of-band performance check is pass/fail. In another type of conventional out-of-band performance check, the server periodically communicates a set of metrics, relative to the server, to the data communications device. The communications device uses the metrics to measure the capacity or performance of the server over time.

For one type of conventional in-band performance check, the data communications device passively observes the success or failure of connections attempted between clients and a server. The communications device determines the performance of the server based upon the server's ability to accept new connections from additional client computers. If the server is able to accept new connections, the data communications device determines that server performance is adequate and continues to forward requests to the server. If the server is unable to accept new connection requests, the communications device determines that server performance is inadequate and redirects incoming requests to other servers in the network. This type of performance check is also a pass/fail check. In another type of conventional in-band performance check, the data communications device measures the amount of time required by the server to respond to a content request. Generally, the data communications device determines that the greater the amount of time required by the server to provide a response, the lower the performance of the server.

SUMMARY OF THE INVENTION

While existing data communications devices determine server performance and balance content requests among the servers connected in a network, the described conventional out-of-band and in-band performance checking methods include several drawbacks. Some conventional data communications devices use a pass/fail method, either out-of-band or in-band, to determine server performance. While this method provides information as to a server's ability to receive additional content requests, it does not provide information relating to the graded performance or capacity of the server. For example, assume a server has a saturation point of eight content requests and the server is currently handling six content requests. If the data communications device uses a pass/fail method to determine server performance, the data communications device will determine that the server is performing adequately because the server is able to receive additional content requests. The data communications device cannot, however, determine that the server is nearing its saturation point because the pass/fail method does not provide information regarding the performance of a server relative to a baseline. The pass/fail method can lead to the data communications device or load-balancer operating each server at or near the maximum limit of its capacity. Such an operating condition can limit the performance, reliability, or correctness of the server and can be undetectable by the data communications device.

In another type of conventional out-of-band performance check, the server communicates a set of metrics, relative to the server, to the data communications device. However, because the metrics are relative to the transmitting server, the metrics are not necessarily correlated among different server environments. This means that the data communications device receives different metrics from different servers that indicate the same capacity measurement of the servers. A lack of uniform metrics requires the data communications device to track metrics for each type of server. This tracking is costly and time consuming. Also, when using metrics, the conventional data communications device is required to perform server profiling in order to determine the server components that contribute to bottlenecking. This allows the conventional data communications device to weigh the set of metrics correctly when arriving at a single metric for capacity measurement. Server profiling, however, is beyond the scope of most data communications devices.

In another type of conventional in-band performance check, the conventional data communications device measures the amount of time required by the server to respond to a content request. However, the measurement of server response time by conventional data communications devices does not take into account variance in response time between different kinds of server objects, connections that are rate limited by the server, such as reliable streaming media transports, or connections that are persistent and show a summed timestamp for multiple objects. A number of other factors contribute to unpredictable server response time, such as server CPU capacity, bandwidth of server systems, threading models, or lock contention. Without taking these factors into account, the conventional data communications device cannot properly determine the performance of the server based upon server response time.

The present invention is directed to techniques for determining the performance of a server, based upon a connection characteristic of a connection between the server and a client. The connection characteristic, such as a Transmission Control Protocol (TCP) window size reported by a server, provides information regarding the performance or capacity of the server. Based upon the connection characteristic, a data communications device configured according to an embodiment of the invention is then able to direct incoming client requests to other servers within a server farm, or group of servers in communication with the data communications device, as required.

According to one embodiment of the invention, a method is provided for a data communications device to determine the performance of a server connected with a client. The method comprises the steps of monitoring a connection characteristic of a connection between the server and the client, detecting a variance in the connection characteristic relative to a preferred connection characteristic, and determining the performance of the server based upon the variance in the connection characteristic. As noted above, the connection characteristic can be a TCP window size reported by the server back to the client. As this value changes, the health or performance of the server can be gauged. Accordingly, new client requests such as new inbound connections are load balanced to a different server if the performance of the monitored server degrades significantly.

This method allows a data communications device to monitor server performance and server capacity, in a continuous manner, over time. This method also eliminates the necessity of the data communications device to monitor system metrics, relative to each server within the network, in order to determine server performance.

In one embodiment, the step of monitoring includes the steps of receiving a series of connection characteristics transmitted from the server, determining a trend for the connection characteristic of the server based upon each connection characteristic transmitted from the server, and setting the preferred connection characteristic for the server based upon the trend for the connection characteristic. This allows the data communications device to establish a baseline value for the connection characteristic based upon the initial performance of the server.

In another embodiment, the step of detecting includes comparing the preferred connection characteristic with an incoming connection characteristic and determining the variance between the preferred connection characteristic and the incoming connection characteristic. This allows the data communications device to monitor the responsiveness or performance of the server based upon each connection characteristic received by the data communications device.

In another embodiment, the step of determining comprises determining a capacity of the server based upon the variance between the preferred connection characteristic and an incoming connection characteristic. Again, this allows the data communications device to monitor the responsiveness or performance of the server based upon each connection characteristic received by the data communications device.

In another embodiment, the method also includes the steps of detecting a content request between a second client and the server, determining the performance of the server, and directing the content request to a second server, based upon the performance of the first server. By utilizing this step, the data communications device balances requests among different servers within a server farm, thereby preventing a single server from becoming overloaded with content requests.

While the aforementioned method is used for any type of connection between a server and client, in one arrangement, the connection is a Transmission Control Protocol (TCP) connection. When such a connection is established between the server and client, the data communications device monitors a Transmission Control Protocol window size reported from the server.

In this embodiment, when a TCP connection is established between the server and client, the step of monitoring includes receiving a series of Transmission Control Protocol window sizes transmitted from the server, determining a trend for the Transmission Control Protocol window size of the server based upon the window sizes transmitted from the server, and setting a preferred Transmission Control Protocol window size for the server based upon the trend for the window size. Also in this embodiment, the step of detecting includes comparing the preferred Transmission Control Protocol window size with an incoming Transmission Control Protocol window size and determining a variance in Transmission Control Protocol window size of the server.

When a TCP connection is established between the server and client, the step of determining includes determining a relative capacity of the server based upon the variance between the preferred Transmission Control Protocol window size and an incoming Transmission Control Protocol window size. A decrease in the variance, in one embodiment, indicates an increase in the capacity of the server.

Other embodiments include a data communications device configured to perform all of the aforementioned methods. One such embodiment includes a data communications device having at least one communications interface, a controller, and an interconnection mechanism coupling the communications interface(s) and the controller. The controller is configured to monitor a connection characteristic of a connection between a server and a client, detect a variance in the connection characteristic relative to a preferred connection characteristic, and determine the performance of the server based upon the variance in the connection characteristic. The controller, in one arrangement, includes a memory and a processor.

Other embodiments of the invention that are disclosed herein include software programs to perform the operations summarized above and disclosed in detail below. More particularly, a computer program product is disclosed which has a computer-readable medium including computer program logic encoded thereon to provide the methods for determining the performance of a server according to this invention and its associated operations. The computer program logic, when executed on at least one processor within a computing system, causes the processor to perform the operations (e.g., the method embodiments above, and described in detail later) indicated herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as the invention.

It is to be understood that the system of the invention can be embodied strictly as a software program, as software and hardware, or as hardware alone. Is also to be understood that the method steps of this invention typically perform (e.g., execute, run, or are otherwise operated) on a data communications device coupled to a network.

It is to be understood that the system of the invention can be embodied strictly as a software program, as software and hardware, or as hardware alone. Is also to be understood that the method for routing a packet of this invention typically performs (e.g., executes, runs, or is otherwise operated) on a data communications device coupled to a data storage or other type of network. In alternative arrangements however, the data communications device of this invention can reside on a computer system located elsewhere on the network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF THE INVENTION

The present invention is directed to mechanisms and techniques for determining the performance of a server, based upon a connection characteristic of a connection between the server and a client. The connection characteristic, such as the TCP window size of the server, provides information regarding the performance or capacity of the server. Based upon the connection characteristic, the data communications device is then able to direct (e.g., load balance) incoming client requests to other servers connected to a network, as required.

Figure 2:
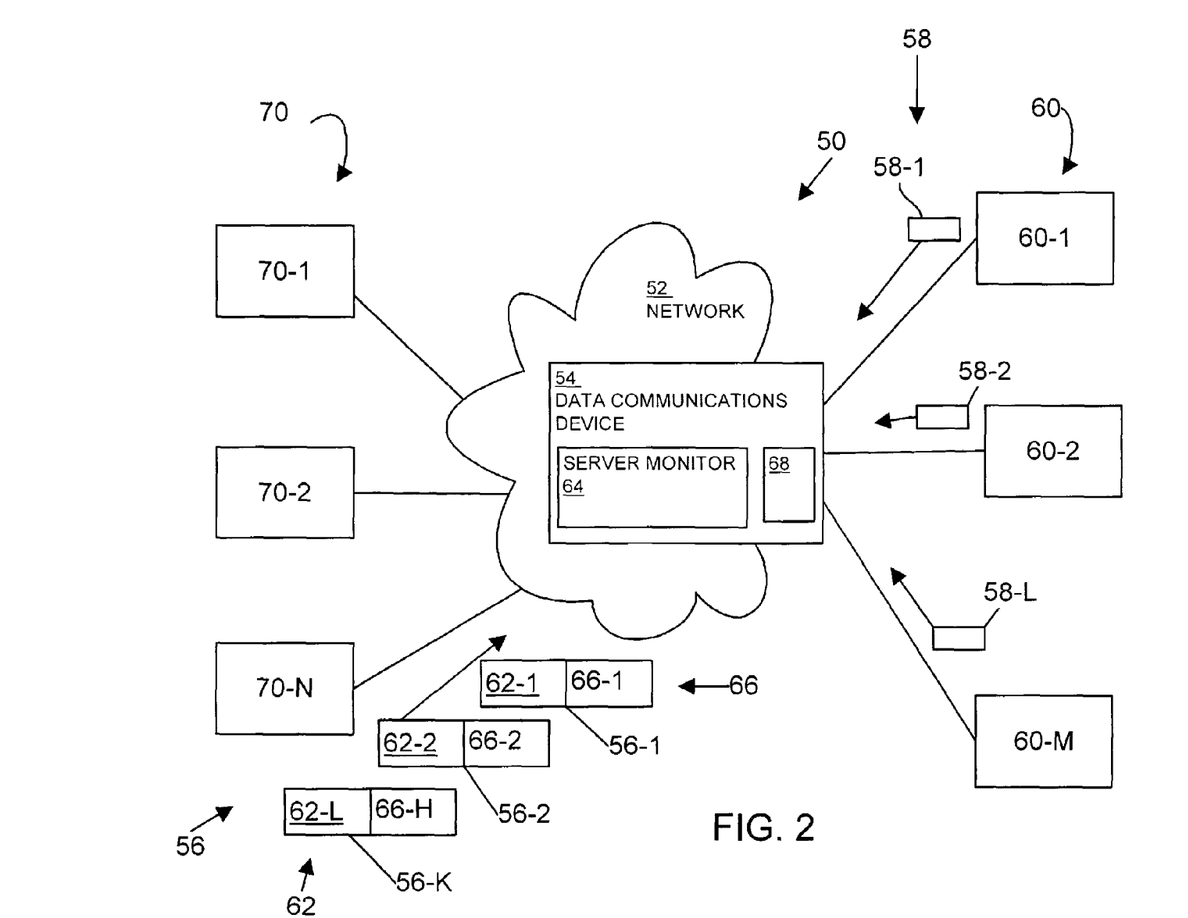
FIG. 2 illustrates a system for monitoring connection characteristics between a server and a client, configured according to one embodiment of the invention.

FIG. 2 illustrates a data communications system, configured according to one embodiment of the invention, given generally as 50. The data communications system 50 includes at least one content supply device or server 70, a data communications device 54 having a server monitor 64, and at least one content request device or client 60. The servers 70 and clients 60 are in communication with the data communication device 54. The server 70 includes multiple servers, illustrated as 70-1, 70-2, and 70-N, and the client 60 includes multiple clients, illustrated as 60-1, 60-2, and 60-M.

The data communications 54 device acts as a point-of-presence in the data communications system 50. The data communications device 54 can be a router, switch, hub, gateway, network access server, proxy server, network bridge, data repeater, protocol converter, and other types of devices that can transmit data between other devices (e.g., clients 60 and servers 70) in the network 52. In this example, the servers 70-1 through 70-N are connected to the data communications device 54 that operates as a load balancer for the servers 70-1 through 70-N when routing client requests 58 to the servers 70. The network 52 can include the Internet or local area network (LAN), for example.

In the data communications system 50, clients 60 submit content requests 58 to a content source, such as a web site served by the servers 70-1 through 70-N. Content requests can also be submitted by multiple clients 60. As illustrated, each client 60-1, 60-2, and 60-M submits a respective content request 58-1, 58-2, and 58-N. The data communications device 54 within the data communications system 50 operates as a load balancer for the web site and intercepts the requests 58 from the client or other source 60 to determine an appropriate server 70 to receive the requests 58. For example, client 60-1 transmits a request 58-1 that is intercepted by the data communications device 54. The data communications device 54 determines that server 70-N includes the information requested by client 60-1. The data communication device then directs the request 58 to the server 70 (e.g., in this case server 70-N).

In order to process client requests 58, the server 70 and client 60 establish a connection with each other. In one arrangement, the connection is a Transmission Control Protocol/Internet Protocol (TCP/IP) connection, typically used as the communications protocol for the Internet or a private network, such as an intranet. The TCP portion of the communications protocol, as configured on a computer transmitting a file or other data is used to manage the decomposition of the data into smaller packets or segments to facilitate transmission of the data over the network. The TCP portion of the communications protocol, as configured on a computer receiving the data, reassembles the segments into order to produce the original data. The IP portion of the communications protocol is used to address each packet or segment to ensure that the segment is transmitted to its proper destination.

For a computer requesting information from a second computer, such as a client 60 requesting information from a server 70, a communications session is established between the two computers on the network. For example, when TCP/IP is used as the communications protocol, a TCP connection is opened by a three-way handshake between the two interacting computers. A connection is initiated by the active, requesting computer or client 60, sending a TCP SYN segment to a passive, receiving computer or server 70.

The receiving server 70 responds by sending a TCP ACK segment, acknowledging reception of the SYN segment, and its own SYN segment. The requesting client computer 60 then forwards an ACK segment to the receiving server 70, thereby establishing a TCP connection with the receiving server 70. Once the connection is established, data packets can be sent over the connection between the client 60 and the server 70.

When the client 60 and server 70 establish a connection with each other during the three-way handshake procedure during the TCP connection and during transmission of data packets over the established connection, the packets or segments transmitted between the client 60 and server 70 include connection characteristics that provide information relating to the performance of the server. The performance of a server is defined as the server's ability to receive additional client requests 58 from requesting clients 60. For example, in the case where a server is not saturated with requests 58 and a client 60 requests information from a server 70, the connection characteristics 62, such as TCP window size transmitted by the server 70 in each response message 56 indicate that the server 70 is able to receive additional content requests. Such an indication shows adequate or high performance of the server. Alternately, in the case where a server is approximately saturated with content requests and a client 60 requests information from a server 70, the connection characteristics transmitted by the server 70 indicate that the server 70 is unable to receive additional requests 58. Such an indication shows inadequate or low performance of the server.

The above-referenced messages, packets or segments 56 include connection characteristics 62 that, in one embodiment of the invention, is used by the data communications device 54 to determine information relating to the capacity or relative capacity of the server 70 from which the characteristics 62 are sent. The capacity of the server 70 is defined as the number of requests 58 that a server is handling at a given time or the number of requests 58 that are located within the queue of the server 70. For example, in the case where a server 70 is not handling many requests 58 and a client 60 requests information from a server 70, the connection characteristics 62 transmitted by the server 70 indicate that the server 70 in a response 56 is not handling many content requests 58. Such an indication shows a low capacity of the server.

Generally, server performance and server capacity are inversely related. When a connection characteristic indicates an adequate or high performance of a server, that same connection characteristic also indicates a low server capacity. Conversely, when a connection characteristic indicates an inadequate or low performance of a server, that same connection characteristic also indicates a high server capacity.

After a connection is established between a server 70 and a client 60, as illustrated in FIG. 2 between the server 70-N and client 60-1, the server 70 transmit responses 56 to the requesting client 60. As shown, the responses 56 include packets or segments, given as 56-1, 56-2, and 56-K. Such responses 56 are performed in a TCP/IP connection, for example. Each segment 56-1, 56-2, 56-K includes a content portion 66, illustrated as 66-1, 66-2, and 66-H, and a connection characteristic 62, illustrated as 62-1, 62-2, and 62-J for each respective packet. The connection characteristics 62 of successive responses 56-1 through 56-K are monitored by a server monitor 64 within the data communications device 54 to determine the performance of the server 70-N. For example, in one arrangement, the server monitor 64 compares the connection characteristics 62 or responses 56 with a preferred connection characteristic 68 to determine if the server 70-N is overloaded with requests 58 or if the server 70-N has reached its capacity to receive requests 58. If the comparison of the connection characteristic 62 of the server 70 with the preferred connection characteristic 68 indicates that the server is overloaded or nearing capacity, the data communications device 54 directs incoming content requests 58 to other servers 70-1, 70-2 within the system 50 that contain the requested content (e.g., within the web site).

Figure 3:
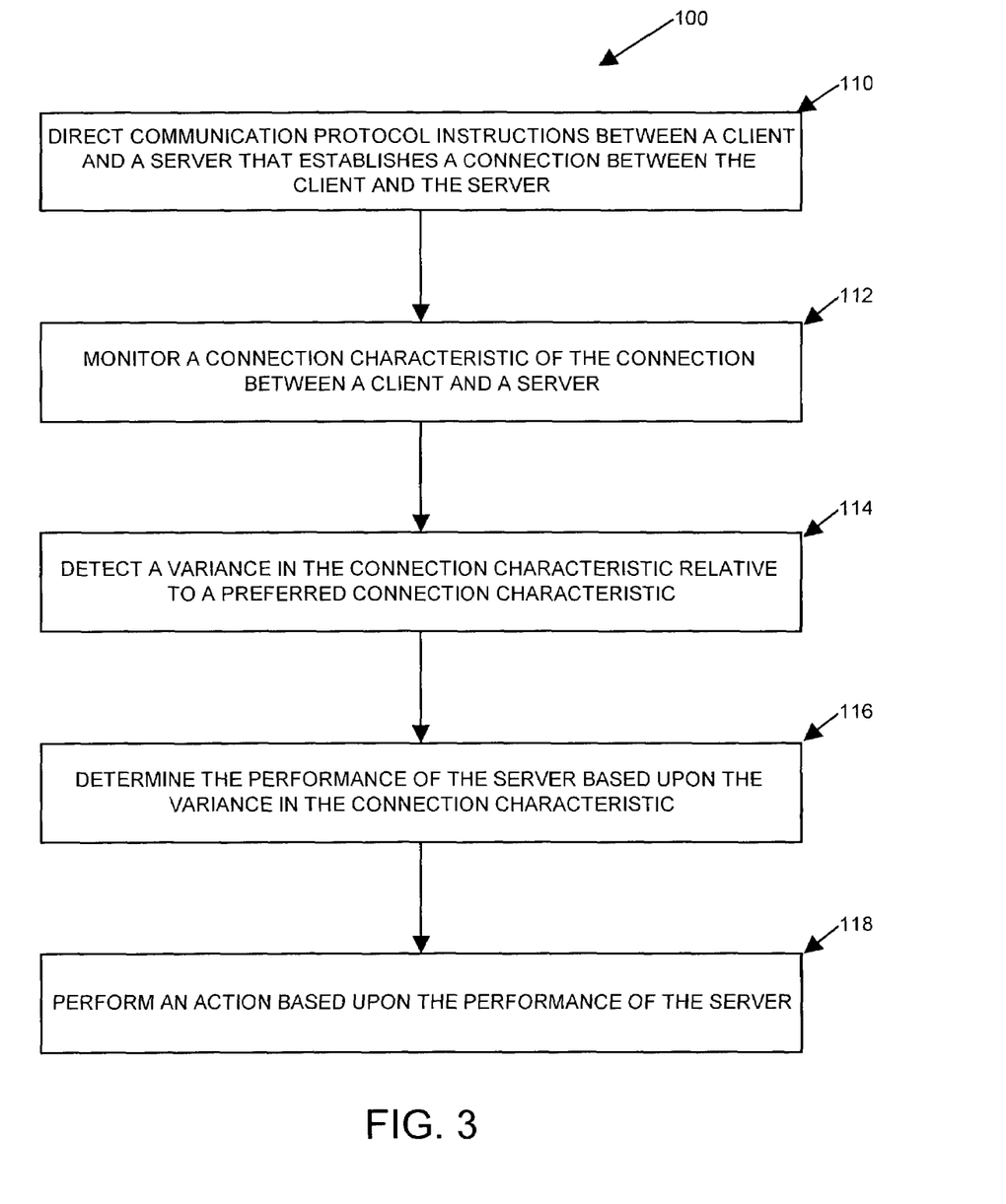
FIG. 3 illustrates a method for determining performance of a server, according to one embodiment of the invention.

FIG. 3 illustrates a method 100 used by a data communications device 54 to determine the performance of a server. In step 110, the data communications device directs communications protocol instructions between a client and a server, where the exchange of instructions establishes a connection or communications link between the client and server. In a data communications system, clients 60 submit requests to a content source, such as a server 70. The data communications device 54 within the data communications system 50 intercepts the request 58 from the client 60 or other source to determine the appropriate server 70 to receive the request 58 and to direct the request 58 to the appropriate server. The data communications device 54 ensures that the communications protocol instructions transmitted from the client 60 are forwarded to the appropriate server 70 and that the communications protocol instructions transmitted from the server 70 are, in turn, forwarded to the requesting client 60.

Next, in step 112, the data communications device monitors a connection characteristic of the connection between the client and the server. The connection characteristic 62 is included in packets 56 transmitted by the server to the client. For example, the connection characteristic can be the TCP window size reported by the server 70 to the client 60 in each message 56. Because this information is part of the packet, 56 the information 62 is available to the data communications device 54 for monitoring.

In step 114, the data communications device detects a variance in the connection characteristic of the server, relative to a preferred connection characteristic 68, shown in FIG. 2. The preferred connection characteristic 62 can include a reference value that is either preset within the data communications device 54 by a systems administrator, for example, or that is established (e.g., as an average) during the transfer of data, such as communications protocol instructions, between the client 60 and the server 70, for example. The preferred connection characteristic 68 represents a value that indicates the optimal performance of a server 70. A change in the communication characteristics 62 relative to the preferred communication characteristic indicates a change in the performance of the server 70.

In one embodiment, the step of detecting the variance in the connection characteristic of the server, shown in step 114, includes the data communications device comparing the preferred connection characteristic with an incoming connection characteristic from the server and determining the variance between the preferred connection characteristic and the incoming connection characteristic. The incoming connection characteristic 62 can be part of a packet 56 that includes a content portion 66, as requested by a client 60. When multiple packets 56 that form a single content element (e.g., a stream of data) are transmitted through the data communications device 54 by a single server 70, the data communications device performs the steps of comparing and determining for every communication connection characteristic 62 of every packet 56. This allows the data communications device 54 to monitor the performance of the server 70 in a continuous manner over time, based upon the packets 56 transmitted to a client 60. Therefore, if the connection characteristic 62 of a server 70 changes during the transmission of packets to a client 60, because the data communications device 54 monitors the connection characteristics 62 in a continuous manner, the device 54 can immediately detect the change in the connection characteristic 62 of the server.

In step 116, the data communications device determines the performance of the server based upon the variance between the connection characteristic of the server and the preferred connection characteristic. As a server 70 receives additional requests 58 from additional requesters or clients 60, the value of the connection characteristic 62 of the server change. In the case where there is a relatively large number of requests directed toward a single server 70, variance between the connection characteristic 62 from the server 70 and the preferred connection characteristic can be relatively large. A relatively large variance, in one embodiment, indicates that the server 70 cannot accept additional requests 58 and, therefore, is performing inadequately. In the case where there is a relatively small number of requests directed toward a single server 70, the variance between the connection characteristic 62 from the server 70 and the preferred connection characteristic 68 is also relatively small. A relatively small variance, in one embodiment, indicates the server 70 can accept additional requests and is, therefore, performing adequately.

Another arrangement of step 116 includes the data communications device determining a relative capacity of the server based upon the variance between the preferred connection characteristic and an incoming connection characteristic. The capacity of the server 70 is defined as the number of requests 58 that are being handled by the server at a single time. When the variance between the connection characteristic 62 from the server over time and the preferred connection characteristic 68 is relatively large, in one embodiment, the relatively large variance indicates the server capacity is high and that the server 70 cannot accept many more requests. For example, when the connection characteristic is the TCP window size of the server, a large decrease in the window size value, compared to a reference value, indicates a non-negligible decrease in server performance and an increase in server capacity. When the variance between the connection characteristic from the server 70 and the preferred connection characteristic 68 is relatively small, in one embodiment, the relatively small variance indicates the server capacity is low and that the server can accept more requests 58. For example, in the case where the connection characteristic is the TCP window size of the server, a small decrease in the window size value, compared to a reference value, indicates a negligible decrease in server performance and a negligible increase a server capacity.

In step 118, the data communications device performs an action based upon the performance of the server. In one embodiment, the data communications device 54 receives a request 58-2 from a second client 60-2, in addition to concurrently handling a connection and processing requests 58-1 between the server 70-N and a first client 60-1. The device then determines the performance of the server 70-N, and directs the request 58-2 to a second server 70-2, based upon the performance of the server 70-N. In the case where the data communications device receives additional requests 58-1, 58-2 and determines that the server 70-N is not performing adequately, the data communications device 54 diverts new incoming requests 58 to other servers 70-1, 70-2 within the system 50, thereby allowing the server 70-N to respond to requests 58 located within its queue. In the case where the data communications device 54 receives additional requests 58-2, 58-1 and determines that the server 70-N is performing adequately, the data communications device 54 can continue to forward content requests to the server 70-N.

Figure 4:
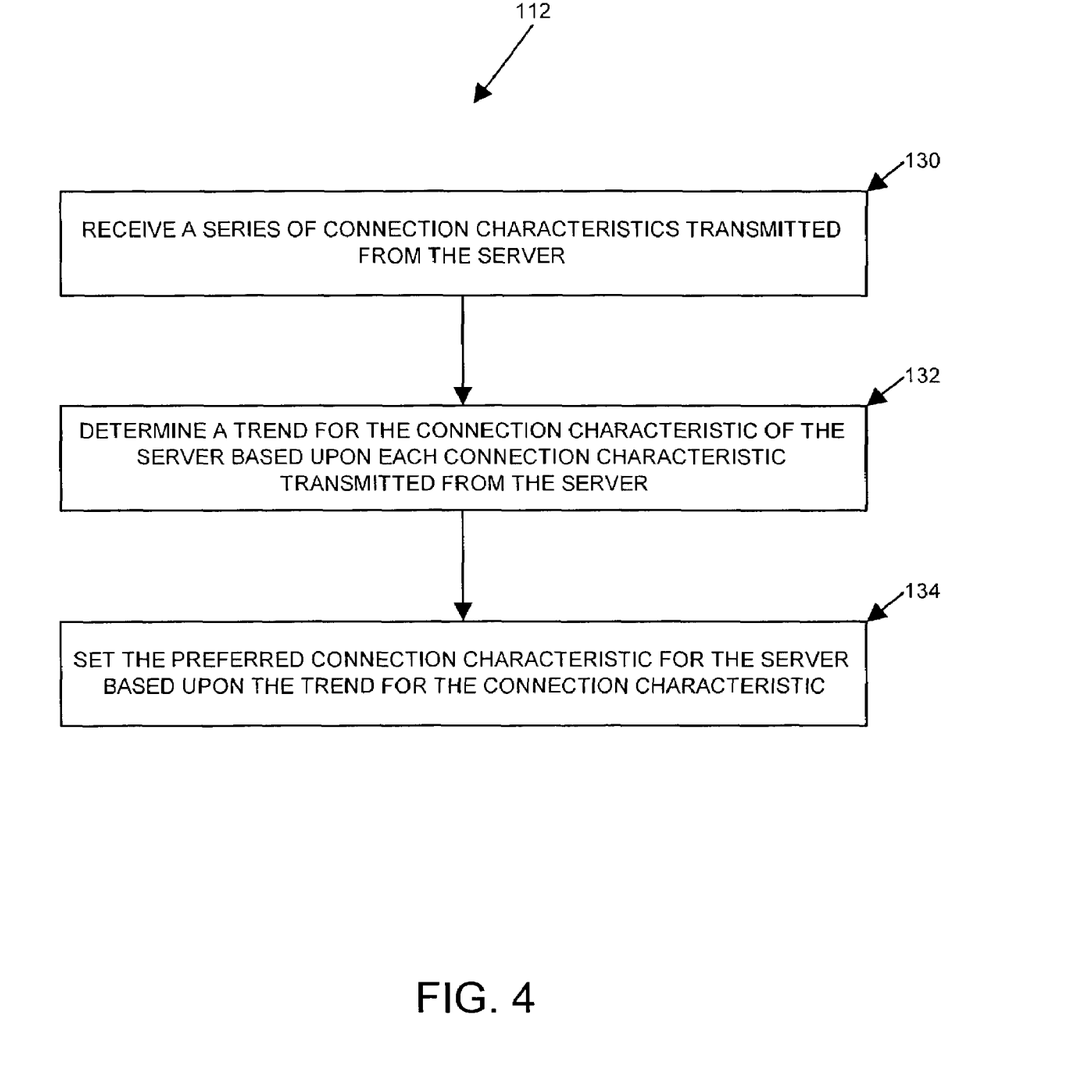
FIG. 4 illustrates a method for monitoring a connection characteristic of a connection between a server and a client, according to one embodiment of the invention.

FIG. 4 illustrates an embodiment of step 112, where the data communications device 54 monitors a connection characteristic 62 of the connection between the client 60 and the server 70, as shown in FIG. 3. In step 130, the data communications device 54 receives a series of connection characteristics 62 from a server 70. In one arrangement, the incoming connection characteristics 62-1 through 62-L are part of a series of multiple packets 56-1 through 56-K that form a single content element, such as a web page, as requested by a client 66. In another embodiment, the incoming connection characteristics are part of the communications protocol instructions transmitted to a client by the server, such as is performed during establishment of a TCP connection.

Next, in step 132, the data communications device determines a trend for the connection characteristic of the server based upon each connection characteristic transmitted from the server. In one arrangement, the data communications device 54 determines the trend by averaging the connection characteristics 62-1 through 62-L of the server 70-N over a certain period of time. In another arrangement, the data communications device 54 determines the trend by monitoring the connection characteristics 62-1 through 62-L over time and detecting the value for the connection characteristic when the variances among incoming connection characteristic 62-1 through 62-L values is minimal or negligible.

In step 134, the data communications device sets the preferred connection characteristic 68 for the server based upon the trend for the connection characteristics 62-1 through 62-L transmitted from the server. The preferred connection characteristic 68 is a value that represents the optimal performance of a server, in one embodiment. The preferred connection characteristic 68 is then used by the data communications device 54 as a reference for comparison to incoming connection characteristics 62 from the server 70. The data communications device 54 then uses the results of the comparison to detect the presence of a variance between the preferred connection characteristic 68 and the incoming connection characteristics from the server 62.

While the methods described above are used for any type of connection between a client and server, in one arrangement, the connection is a TCP connection. As described above, when a client and a server establish a connection with each other during a TCP connection set-up process, the client and server transmit packets or segments that include connection characteristics 62. One connection characteristic 62 of interest is the TCP window size of the transmitting device or server 70. The window size indicates for example, the amount of space, in bytes, that the transmitter of a packet has available to receive unacknowledged data. Therefore, the window size of the server 70 provides information to a client or a data communications device about the server's ability to receive more data requests.

The server indicates server overloading or congestion through a reduction in the TCP window size, as reported by the server to a client or data communications device over time. For example, assume that a data communications device determines that the preferred connection characteristic or preferred value for the window size for a server is, on average, 3,000 bytes. If the server reduces the window size to 2,000 bytes during the life of a connection to a client 60, the data communication device receives the value of 2,000 bytes as the window size for the server and compares it against the preferred value. The variance or reduction in window size of 1,000 bytes indicates to the data communications device 54 that the server is becoming overloaded. This change can happen quickly or over a period of time for a number of messages 56. Because the window size 62 of the server is recognizable to a data communications device by way of in-band examination, the data communications device is able to distribute additional incoming requests 58 to other servers within the data communications system based on the reduction in the size of the window from a single server. Depending upon the embodiment, these additional requests 58 can be for the same connection or for different or new connections.

In one embodiment, the data communications device 54 forms a feedback loop with the servers 70 in a server farm or group of servers. The relative weight of each server 70 within the server farm is regulated by the data communications device's monitoring of the TCP window size for each server 70 within the group. This regulation allows the servers within the farm to run at or near a subscription or maximum allowed level while maintaining a load beneath the saturation level of each server.

Figure 5:
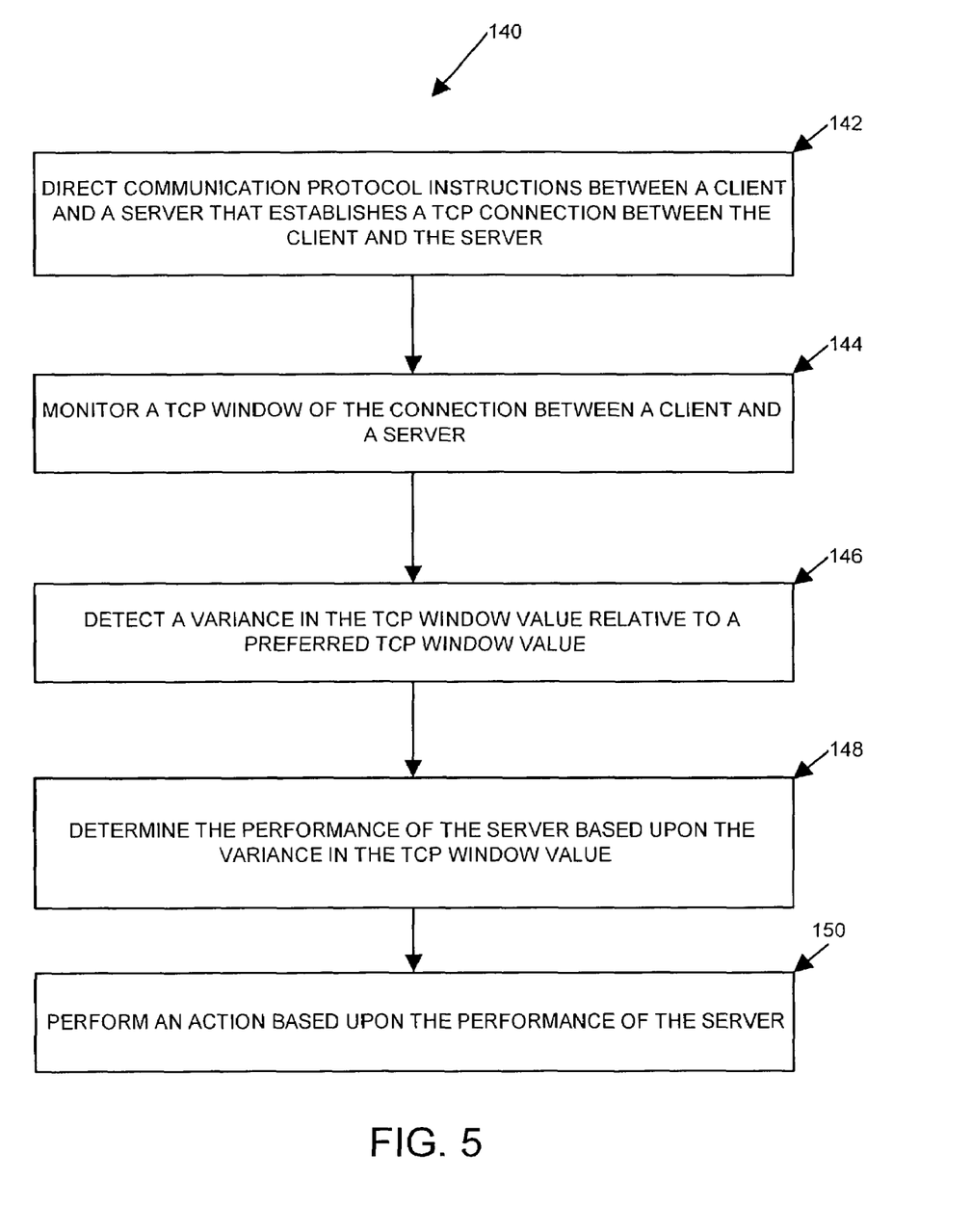
FIG. 5 illustrates a method for determining the performance of a server connected to a client by a Transmission Control Protocol (TCP) connection, according to one embodiment of the invention.

FIG. 5 illustrates a method 140 for determining the performance of a server connected to a client by a Transmission Control Protocol connection, in another embodiment of the invention.

In step 142, the data communications device 54 directs communications protocol instructions between a client 60 and a server 70, where the exchange of instructions establishes a TCP connection or communications link between the client and server.

Next, in step 144, the data communications device monitors a connection characteristic of the connection where the connection characteristic is the window size of the connection between the client and the server. In one embodiment, the window size indicates the performance of the server or the ability for the server to receive additional content requests. In another embodiment, the window size indicates the server capacity or the number of content requests that the server is in the process of handling at one time.

The step of monitoring by the data communications device, in another embodiment, includes the steps of receiving a series of TCP window sizes transmitted from the server, determining a trend for the TCP window size of the server based upon the window sizes (e.g., 62) transmitted from the server, and setting a preferred TCP window size for the server based upon the trend for the window size. For example, assume the server transmits five packets to the data communications device where the window size for the first packet is 3,000, the window size for the second packet is 2,999, the window size for the second packet is 3,001, the window size for the fourth packet is 3,002, and the window size for the fifth packet is 2,998. The data communications device determines a trend for the window size, such as by averaging the values, for example. In this case the average of the window size values is 3,000 bytes. The data communications device sets the preferred window size value based upon the trend. The trending procedure can be performed during the TCP slowstart phase or thereafter in establishment of a communications link or session between the server and the client.

In step 146, the data communications device detects a variance in TCP window size or value of the server, relative to a preferred TCP window size. In one arrangement, the data communications device detects the variance by comparing the preferred TCP window size with an incoming (e.g., receive) TCP window size from a server and determining a variance in the TCP window size of the server. For example, assume that the preferred window size is 3,000 bytes. Also assume that the TCP connection determines that content requests are "stacking up" in the servers' queue. The TCP connection processing in the server then reduces the server window size to prevent clients from sending additional requests. If the server delivers a packet 56 to the data communications device 54 on route to a client 70 where the current (i.e., incoming) window size of the server is reduced to 1,000 bytes, a comparison of the preferred and current window size yields a variance of 2,000 bytes.

In step 148, the data communications device determines the performance of the server based upon the variance between the window size of the server and the preferred window size or value. As stated above, the performance of a server 70 is defined as the server's ability to receive additional content requests from requesting clients. In the above example, the variance in window size is 2,000 bytes, a relatively large variance. This large variance, or decrease in window size, indicates the server 70 cannot accept many more content requests without reaching its saturation point. Therefore, from the above example the large variance indicates inadequate or low performance of the server 70 and thus, requests 58 are directed to another server.

In another embodiment, the data communications device also determines the capacity of the server based upon the variance between the preferred TCP window size and an incoming TCP window size. As stated above, the capacity of a server is defined as the number of content requests that a server is handling at a given time. In the above example, the variance in window size is a decrease of 2,000 bytes. This relatively large variance indicates that the server has accepted a relatively large number of content requests and is operating at an increased capacity. As shown by this example, a decrease in the variance indicates an increase in the capacity of the server.

In step 150, the data communications device performs an action based upon the performance of the server. In the case where the data communications device has determined that the server is not performing optimally or adequately, the data communications device can divert incoming content requests to other servers within the system. In the case where the data communications device has determined that the server is performing adequately or optimally, the data communications device can continue to forward content requests to the server.

The above example illustrates the data communications device monitoring a sudden decrease in the window size of the server and performs an action, in this case redirecting incoming content requests to other servers, based upon the sudden decrease. Because, however, the data communications device monitors the widow size of the server based upon a series of packets transmitted by the server to a client, the data communications device can determine gradual decreases in window size from the server and take an appropriate action regarding incoming content requests based on the gradual window size decrease.

Also, the data communications device, in one embodiment, includes a threshold level at which the device determines when the performance of a server is inadequate or when the capacity of the server has been reached. In one embodiment of a data communications device, for example, a gradual or sudden decrease in server window size by, for example, 1,000 bytes or more, relative to a preferred window size, indicates either inadequate server performance or an increased capacity of the server and causes the device to redirect incoming content requests to another server in the network. In this example, the threshold is a variance of 1,000 bytes. In other embodiments, other variance values are used to cause the data communications device to redirect incoming content requests to other servers in the network.

The data communications device also detects increases in window size, whether gradual or sudden. For example, an increase in window size from 1,000 bytes to 2,500 bytes indicates an increase in performance of a server and a decrease in capacity of the server. Based on this increase in window size, a data communications device can direct incoming requests to the server.

Figure 6:
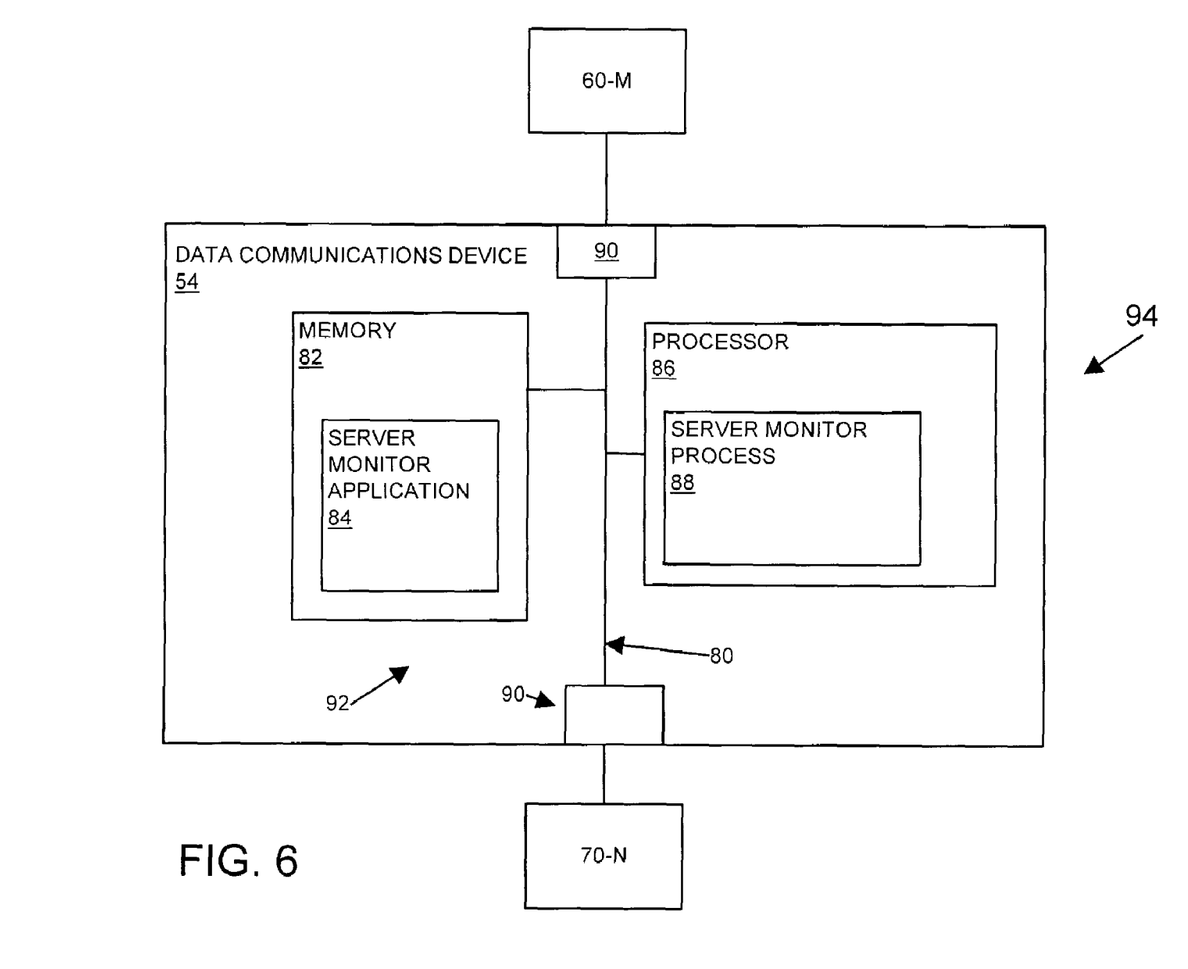
FIG. 6 illustrates a computer device, configured as a data communications device, according to one embodiment of the invention.

FIG. 6 illustrates a computer device 94, configured to run as a data communications device 54, that shows one embodiment of the invention. The computer device 94 includes an interconnection mechanism 80 such as a data bus or circuitry that interconnects a memory 82, a processor 86 and one or more communications interfaces 90. The memory 82 can be of any type of volatile or non-volatile memory or storage system such as a computer memory (e.g., random access memory (RAM), read only memory (ROM), or another type of memory) disk memory, such as hard disk, floppy disk, optical disk, for example. The memory 82 is encoded with logic instructions and/or data that, in one embodiment of the computer device 94, forms a server monitor application 84 configured according to embodiments of the invention. In other words, the server monitor application 84 represents software coding instructions and/or data that reside within the memory or storage 82, or within any computer readable medium accessible to the computer device 94. The processor 86 represents any type of circuitry or processing device such as a central processing unit, controller, application specific integrated circuit, programmable gate array, or other circuitry that can access the server monitor application 84 encoded within the memory 82 over the interconnection mechanism 80 in order to run, execute, interpret, operate, or otherwise perform the server monitor application 84 logic instructions. In other words, in another embodiment of the computer device 94, the server monitor process 88 represents one or more portions of the logic instructions of the server monitor application 84 while being executed or otherwise performed on, by, or in the processor 86 within the computer device 94.

Those skilled in the art will understand that there can be many variations made to the operations of the embodiments explained above while still achieving the same objectives of the invention.

As described above, after a connection is established between a server 70 and a client 60, the server 70 transmits responses 56 to the requesting client 60. Each response or segment 56-1, 56-2, 56-K includes a content portion 66, illustrated as 66-1, 66-2, and 66-H, and a connection characteristic 62, illustrated as 62-1, 62-2, and 62-J for each respective packet. The data communications device 54 monitors the connection characteristics 62 of successive responses 56-1 through 56-K to determine the performance of the server 70-N. In one arrangement, the server monitor 64 compares the connection characteristics 62 with the preferred connection characteristic 68 to determine if the server 70-N is overloaded with requests 58 or if the server 70-N has reached its capacity to receive requests 58. If the comparison of the connection characteristic 62 of the server 70 with the preferred connection characteristic 68 indicates that the server is overloaded or nearing capacity, the data communications device 54 directs incoming content requests 58 to other servers 70-1, 70-2 within the system 50 that contain the requested content (e.g., within the web site).

In an alternate embodiment, the data communications device 54 adjusts the server's last-transmitted connection characteristic 62 (e.g., receive window size) after receiving data, such as a data request, from a client 60 and prior to receiving an updated connection characteristic 62 from the server 70. By adjusting the last-transmitted connection characteristic 62 in this manner, the data communications device 54 detects the loading or capacity (e.g., the offered receive window size) of the server 70 and reduces inaccuracies in detecting the loading of the server 70 caused by a lag in receiving an updated connection characteristic 62 from the server 70.

For example, assume the server 70 has offered the client 60 an 8,000 byte window size and the client 60 transmits a 1,000 byte content request 58 to the server 70 that is intercepted by the data communications device 54. After the data communications device 54 transmits the 1,000 bytes to the server 70, but before receiving the server's 70 reply to the client content request 58, the data communications device 54 adjusts the effective offered window size of the server 70 from 8,000 bytes to 7,000 bytes. Therefore, when determining the server 70 loading or capacity, the data communications device 54 uses the window size of 7,000 bytes (e.g., the content request 58) as the connection characteristic 62 of the server 70 when comparing the connection characteristic 62 of the server 70 with the preferred connection characteristic 68. The data communications device 54 uses the window size of 7,000 bytes as the connection characteristic 62 during this comparison until the data communications device 54 receives a reply from the server 70 to the client content request 58, such as by an acknowledgment having an updated connection characteristic 62 (e.g., receive window size).

In another alternate embodiment, rather that detect changes in the connection characteristic 62 from the server 70, the data communications device 54 detects a duration of time that passes between changes or a variation in the connection characteristic 62 from the server 70 (e.g., the increases and decreases in the window size indicated by the server 70) to determine the loading or capacity of the server 70. Therefore, the greater the amount of time that a server 70 offers a reduced connection characteristic 62 (e.g., reduced window size), the greater the amount of loading on the server 70.

The connection characteristic 62 (e.g., window size) of a server 70 can vary when client 60 transmits new data into the server 70 and that data is either retained within a TCP stack associated with the server 70 or consumed by an application of the server 70, at which point the server 70 can increase the window size of the server's 70 receive window. In certain situations, the connection characteristic 62 of the server 70 can remain unchanged even after the server 70 receives data from the client 60. If the server 70 or application is interrupt-driven with upcalls/notifications into the application layer, then the server 70 can engage the application to run before the server's 70 TCP stack can provide an acknowledgement to the content request 58.

For example, assume the server 70 offers the client 60 an 8,000 byte window size and the client 60 transmits a 1,000 byte content request 58 to the server 70. If the server 70 delays generating the acknowledgment (e.g., because of timer granularity or because the server 70 has data to transmit to the client that it will "piggyback" to the acknowledgment) the server 70 can make the 1,000 bytes available to the application associated with the server 70, the server 70 transmits a connection characteristic 62 to the client 60 indicating a window size availability of 8,000 bytes, rather than an "actual" availability of 7,000 bytes.

In the alternate embodiment, the data communications device 54 detects a duration of time that passes between changes in the connection characteristic 62 from the server 70 to determine the loading or capacity of the server 70. For example, consider a first server 70 that utilizes 80% of its time offering a 7,000 byte window size and 20% of its time offering an 8,000 byte window size compared to a second server 70 that utilizes 99% of its time offering a 6,000 byte window size an and 1% of its time offering a 1,000 byte window size. While the first server 70 offers a larger window size that the second server 70, the first server 70 operates at a greater loading level than the second server 70 because it offers a smaller window size for a longer duration compared to the second server 70. The difference in loading is not a matter of the variation between the offered window sizes for the servers 70 but is based upon a time-weighted distribution of the window size offered by each server 70.

Many interactions between the client 60 and the server 70 involve data flowing from the server 70 to the client 60. In another alternate embodiment, the data communications device 54 detects the server's 70 response to changes in the client's 60 receive window size (e.g., the client's connection characteristic), offered to the server 70, to determine loading of the server 70. For example, the data communications device 54, in order to determine the loading of the server 70, can detect or count how often the server 70 "underruns" or transmits a response having a data size that falls below the receive window size offered by the client 60. For example, if the data communications device 54 detects the server 70 "underrunning" the receive window size offered by the client 60 for a particular number of times above a given threshold level, the data communications device can detect a relatively high loading level on the server 70.

Such variations are intended to be covered by the scope of this invention. As such, the foregoing description of embodiments of the invention is not intended to be limiting. Rather, any limitations to embodiments of the invention are presented in the following claims.

What is claimed is:

1. In a data communications device, a method for determining the performance of a server, connected with a client, comprising the steps of:
    monitoring a connection characteristic of a connection between the server and the client;
    detecting a variance in the connection characteristic relative to a preferred connection characteristic; and
    determining the performance of the server based upon the variance in the connection characteristic;
    wherein the connection is a Transmission Control Protocol connection and wherein the step of monitoring comprises monitoring a Transmission Control Protocol window size from the server; and
    wherein the step of monitoring further comprises:
        receiving a series of Transmission Control Protocol window sizes transmitted from the server;
        determining a trend for the Transmission Control Protocol window size of the server based upon the window sizes transmitted from the server; and
        setting a preferred Transmission Control Protocol window size for the server based upon the trend for the window size;
        wherein determining the trend includes comparing the connection characteristic of the connection over multiple successive communication transaction cycles between the server to the client to identify when the performance of the server increases as indicated by most recently received connection characteristics being nearer in value to the preferred connection characteristic, the connection characteristic being a window size generated by the server and sent to the client for purposes of limiting an amount of data sent by the client to the server.

2. The method of claim 1 wherein the step of detecting comprises:
    comparing the preferred connection characteristic with an incoming connection characteristic; and
    determining a variance between the preferred connection characteristic and the incoming connection characteristic.

3. The method of claim 1 wherein the step of determining further comprises determining a capacity of the server based upon the variance between the preferred connection characteristic and an incoming connection characteristic.

4. The method of claim 1 further comprising the steps of:
    detecting a content request between a second client and the server;
    determining the performance of the server; and
    directing the content request to a second server, based upon the performance of the server.

5. The method of claim 1 wherein the step of detecting comprises:
    comparing the preferred Transmission Control Protocol window size with an incoming Transmission Control Protocol window size; and
    determining a variance in Transmission Control Protocol window size of the server.

6. The method of claim 1 wherein the step of determining further comprises determining a capacity of the server based upon the variance between the preferred Transmission Control Protocol window size and an incoming Transmission Control Protocol window size.

7. The method of claim 6 further comprising determining a decrease in the variance, the decrease in variance indicating an increase in the capacity of the server.

8. The method of claim 1 further comprising the steps of:
    receiving a content request from a client, and
    adjusting a last-transmitted connection characteristic from the server prior to receiving an updated connection characteristic and based upon the content request; and
    wherein the step of detecting comprises detecting a variance in the last-transmitted connection characteristic relative to a preferred connection characteristic.

9. A data communications device comprising:
    at least one communications interface;
    a controller; and
    an interconnection mechanism coupling the at least one communications interface and the controller;
    wherein the controller is configured to:
        monitor a connection characteristic of a connection between a server and a client;
        detect a variance in the connection characteristic relative to a preferred connection characteristic; and
        determine the performance of the server based upon the variance in the connection characteristic;
    wherein the data communication device is disposed at an intermediate network node on a respective network path between the client and the server, the controller being configured to:
    receive first communications originating from the server and forward the received first communications to the client and, in a reverse direction, receive second communications originated by the client and forward the second communications to the server; and wherein the controller further configured to:
receive a series of connection characteristics transmitted from the server;
determine a trend for the connection characteristic of the server based upon each connection characteristic transmitted from the server; and
set the preferred connection characteristic for the server based upon the trend for the connection characteristic; and
wherein determining the trend includes comparing the connection characteristic of the connection over multiple successive communication transaction cycles between the server to the client to identify when the performance of the server increases as indicated by most recently received connection characteristics being nearer in value to the preferred connection characteristic, the connection characteristic being a window size generated by the server and sent to the client for purposes of limiting an amount of data sent by the client to the server.

10. The data communications device of claim 9 wherein the controller is further configured to:
compare the preferred connection characteristic with an incoming connection characteristic; and
determine a variance between the preferred connection characteristic and the incoming connection characteristic.

11. The data communications device of claim 9 wherein the controller is further configured to determine a capacity of the server based upon a variance between the preferred connection characteristic and an incoming connection characteristic.

12. The data communications device of claim 1 wherein the controller is further configured to:
detect a content request between a second client and the server;
determine a reduction in the performance of the server; and
direct the content request to a second server, based upon the performance of the server.

13. The data communications device of claim 9 wherein the connection is a Transmission Control Protocol connection and the controller is further configured to monitor a Transmission Control Protocol window size from the server.

14. The data communications device of claim 13 wherein the controller is further configured to:
receive a series of Transmission Control Protocol window sizes transmitted from the server;
determine a trend for the Transmission Control Protocol window size of the server based upon the window sizes transmitted from the server; and
set a preferred Transmission Control Protocol window size for the server based upon the trend for the window size.

15. The data communications device of claim 14 wherein the controller is further configured to:
compare the preferred Transmission Control Protocol window size with an incoming Transmission Control Protocol window size; and
determine a decrease in Transmission Control Protocol window size of the server.

16. The data communications device of claim 14 wherein the controller is further configured to determine a capacity of the server based upon a variance between the preferred Transmission Control Protocol window size and an incoming Transmission Control Protocol window size.

17. The data communications device of claim 16 wherein the controller is further configured to determine a decrease in the variance to indicate an increase in the capacity of the server.

18. The data communications device of claim 9, the controller is further configured to:
receive a content request from a client, and
adjust a last-transmitted connection characteristic from the server prior to receiving an updated connection characteristic and based upon the content request; and
when detecting, the controller is configured to detect a variance in the last-transmitted connection characteristic relative to a preferred connection characteristic.

19. A data communications device as in claim 9, wherein the controller in the data communication device is configured to:
receive a data packet originated by the server which is sent to the client, the data packet including a content portion as well as a window size indicating to the client how much data can be received by the server from the client on a subsequent client data transfer;
inspect the data packet to identify the window size specified by the server; and
determine a difference between the window size and a preferred window size to identify a relative ability of the server to handle requests by other clients.

20. A data communications device as in claim 9, wherein the controller is configured to:
receive data packets originated by each of multiple servers for transmission to respective clients, each of the data packets including a content portion as well as a window size indicating to a corresponding client how much data can be received by a respective server from the corresponding client on a subsequent client data transfer;
inspect the data packets to identify window sizes specified by the servers for multiple requests;
determine a difference between window sizes and respective preferred window sizes associated with the servers to identify relative abilities of the servers to handle data requests; and
based on the relative abilities of the servers to handle the data requests, utilizing feedback to regulate a flow of data from the servers to the respective clients.

21. A data communications device as in claim 9, wherein the connection characteristic is a window size associated with a communication session between a first client and the server, the controller configured to:
recognize a reduction in the window size associated with the communication session, the reduction indicating that the server has become closer to being overloaded; and
based on recognizing the reduction in the window size, initiate redirection of a second client request directed to the server to another server for servicing to prevent the server from being overloaded.

22. A data communication device as in claim 21, wherein the controller is configured to:
perform in-band examination of respective data packets associated with the communication session to identify when the window size specified by the server decreases indicating that the server nears an overload condition in which the server is unable to efficiently handle the second client request.

23. A data communication device as in claim 9, wherein the controller is configured to:
monitor connection characteristics of successive responses from the client to determine a respective performance of the server;
compare the connection characteristics with the preferred connection characteristic to determine if the server is overloaded with requests and has reached its capacity to receive requests;
if the comparison of the connection characteristic of the server with the preferred connection characteristic indicates that the server has reached its capacity to service requests, redirecting incoming content requests to other servers.

24. A computer program product having a computer-readable medium including computer program logic encoded thereon that, when performed on a processor in a computerized device having a coupling of a memory, a processor, and at least one communications interface provides a method for performing the operations of:
monitoring a connection characteristic of a connection between the server and the client and a server;
detecting a variance in the connection characteristic relative to a preferred connection characteristic; and
determining the performance of the server based upon the variance in the connection characteristic;
wherein monitoring the connection characteristic includes:
receiving a series of connection characteristics transmitted from the server;
determining a trend for the connection characteristic of the server based upon each connection characteristic transmitted from the server; and
setting the preferred connection characteristic for the server based upon the trend for the connection characteristic; and
wherein determining the trend includes comparing the connection characteristic of the connection over multiple successive communication transaction cycles between the server to the client to identify when the performance of the server increases as indicated by most recently received connection characteristics being nearer in value to the preferred connection characteristic, the connection characteristic being a window size generated by the server and sent to the client for purposes of limiting an amount of data sent by the client to the server.

25. A data communications device comprising:
at least one communications interface;
a controller; and
an interconnection mechanism coupling the at least one communications interface and the controller;
wherein the controller is configured to produce a means for determining the performance of a server connected with a client, such means including:
means for monitoring a connection characteristic of a connection between the server and the client and a server;
means for detecting a variance in the connection characteristic relative to a preferred connection characteristic; and
means for determining the performance of the server based upon the variance in the connection
wherein means for monitoring the connection characteristic includes:
means for receiving a series of connection characteristics transmitted from the server;
means for determining a trend for the connection characteristic of the server based upon each connection characteristic transmitted from the server; and
means for setting the preferred connection characteristic for the server based upon the trend for the connection characteristic; and
wherein means for determining the trend includes means for comparing the connection characteristic of the connection over multiple successive communication transaction cycles between the server to the client to identify when the performance of the server increases as indicated by most recently received connection characteristics being nearer in value to the preferred connection characteristic, the connection characteristic being a window size generated by the server and sent to the client for purposes of limiting an amount of data sent by the client to the server.

26. In a data communications device, a method for determining the performance of a server, connected with a client, comprising:
monitoring a connection characteristic of a connection between the server and the client;
detecting a variance in the connection characteristic relative to a preferred connection characteristic;
detecting a duration of time between the variance in the connection characteristic relative to a preferred connection characteristic; and
determining the performance of the server based upon the duration of time between changes in the connection characteristic;
wherein monitoring the connection characteristic includes:
receiving a series of connection characteristics transmitted from the server;
determining a trend for the connection characteristic of the server based upon each connection characteristic transmitted from the server; and
setting the preferred connection characteristic for the server based upon the trend for the connection characteristic; and
wherein determining the trend includes comparing the connection characteristic of the connection over multiple successive communication transaction cycles between the server to the client to identify when the performance of the server increases as indicated by most recently received connection characteristics being nearer in value to the preferred connection characteristic, the connection characteristic being a window size generated by the server and sent to the client for purposes of limiting an amount of data sent by the client to the server.

27. A data communications device comprising:
at least one communications interface;
a controller; and
an interconnection mechanism coupling the at least one communications interface and the controller;
wherein the controller is configured to:
monitor a connection characteristic of a connection between the server and the client;
detect a variance in the connection characteristic relative to a preferred connection characteristic;
detect a duration of time between the variance in the connection characteristic relative to a preferred connection characteristic; and
determine the performance of the server based upon the duration of time between changes in the connection characteristic;

wherein the controller is further configured to:
  receive a series of connection characteristics transmitted from the server;
  determine a trend for the connection characteristic of the server based upon each connection characteristic transmitted from the server;
  set the preferred connection characteristic for the server based upon the trend for the connection characteristic; and
  compare the connection characteristic of the connection over multiple successive communication transaction cycles between the server to the client to identify when the performance of the server increases as indicated by most recently received connection characteristics being nearer in value to the preferred connection characteristic, the connection characteristic being a window size generated by the server and sent to the client for purposes of limiting an amount of data sent by the client to the server.

* * * * *